US011430073B2

(12) United States Patent
Medalion et al.

(10) Patent No.: US 11,430,073 B2
(45) Date of Patent: Aug. 30, 2022

(54) SYSTEM AND METHOD FOR PROVIDING PRIVACY PRESERVING JOINT TAX RETURN FILINGS

(71) Applicant: INTUIT INC., Mountain View, CA (US)

(72) Inventors: Shiomi Medalion, Tel Aviv (IL); Yair Horesh, Tel Aviv (IL); Yehezkel Shraga Resheff, Tel Aviv (IL); Daniel Ben David, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 35 days.

(21) Appl. No.: 16/858,572

(22) Filed: Apr. 24, 2020

(65) Prior Publication Data

US 2021/0334907 A1 Oct. 28, 2021

(51) Int. Cl.
*G06Q 40/00* (2012.01)
*G06Q 10/10* (2012.01)
*H04L 9/40* (2022.01)
*G06Q 50/26* (2012.01)

(52) U.S. Cl.
CPC .......... *G06Q 40/123* (2013.12); *G06Q 10/10* (2013.01); *G06Q 40/10* (2013.01); *G06Q 50/265* (2013.01); *H04L 63/10* (2013.01)

(58) Field of Classification Search
CPC ...... G06Q 40/123; G06Q 40/10; G06Q 10/10; G06Q 50/265; H04L 63/10
See application file for complete search history.

(56) References Cited

U.S. PATENT DOCUMENTS

| 9,916,626 | B2* | 3/2018 | Huang | G06T 7/00 |
| 2012/0109792 | A1* | 5/2012 | Eftekhari | G06Q 40/02 |
| | | | | 705/31 |
| 2012/0323774 | A1* | 12/2012 | Gardner | G06Q 40/00 |
| | | | | 705/40 |
| 2016/0125552 | A1* | 5/2016 | Pathak | G06Q 40/00 |
| | | | | 705/31 |
| 2019/0156431 | A1* | 5/2019 | Houseworth | G06Q 40/123 |

OTHER PUBLICATIONS

Hecht, A. (Feb. 18, 2020). If you're married, here's howto choose the filing status that will save you the most on your taxes. CNBC, https://www.cnbc.com/2020/02/14/married-filing-jointly-vs-separately-how-to-choose-your-tax-filing-status.html. (Year: 2020).*
Department of Treasury. (2019). Tax Guide 2019. https://www.irs.gov/pub/irs-pdf/p17.pdf (Year: 2019).*

* cited by examiner

*Primary Examiner* — Peter Ludwig
*Assistant Examiner* — Avia Salman
(74) *Attorney, Agent, or Firm* — DLA Piper LLP (US)

(57) ABSTRACT

Systems and methods that may be used to allow married couples to prepare separate individual tax returns while also being able to evaluate the merits of filing a joint return in a manner that does not breach each spouse's financial privacy.

16 Claims, 8 Drawing Sheets

FIG. 5

From: Tax Provider
To: Spouse <spouse@example.com>
Subject: Invitation to join your spouse in a privacy preserving tax return process

---

Hi,

Your spouse (taxpayer@example.com) has invited you to participate in a process to evaluate whether the two of you should file a joint tax return or whether you each should file an individual return. Right now, your spouse is preparing an individual return. If you click on the link below, you will be able to prepare your individual return without your spouse having access to the information used to fill out the return. This means, that your financial information and privacy is preserved until you want to share it with your spouse!

Once you and your spouse complete your individual returns, we will prepare a joint return and evaluate whether the joint return is more beneficial to you and your spouse. If so, we will send both of you the joint return with a recommendation for filing it. If not, we will send each of you a separate email with a recommendation to file your respective individual return.

If you wish to participate, please click on this link to get started.

FIG. 6

SYSTEM AND METHOD FOR PROVIDING PRIVACY PRESERVING JOINT TAX RETURN FILINGS

BACKGROUND

It is known that one of the first options selected during tax preparation is the taxpayer's filing status. As can be appreciated, it is important for the taxpayer to select the right status for his/her situation because this choice may affect the amount of taxes to pay, standard deductions that can be taken and any tax breaks that the taxpayer is eligible to claim.

Married couples have the option to file jointly or separately. The IRS (Internal Revenue Service) often encourages married couples to file joint tax returns by extending several tax breaks to those who file jointly as opposed to those who file separately.

In the vast majority of cases, married couples file jointly, but there may be instances when it is desirable to submit separate returns. For example, one spouse may want to file separately when he/she does not want to be liable for his/her spouse's tax bill as the IRS will not apply one spouse's tax refund to the other spouse's balance due. In addition, separate tax returns may be appropriate for couples in the process of getting a divorce, which may help to avoid post-divorce complications with the IRS.

More significantly, however, is the possibility for the married couple to collectively pay less taxes and or get a larger refund by filing separately. For example, one spouse may be able to take larger deductions because as an individual he/she has a lower adjusted gross income (AGI), lowering the threshold for some deductions (e.g., out-of-pocket medical expenses and or casualty losses).

One way to find out if a married couple should file jointly or separately is to prepare multiple returns: one joint return and two individual returns. The couple then simply needs to compare the net refunds and or balances due from each filing method and select the method with the better outcome.

When a married couple files separately, each spouse selects "married filing separately." This status allows each spouse to report his/her respective income, exemptions, deductions, and credits on two separate tax returns. If they so desire, each spouse may prevent the other spouse from seeing this information. To determine if a joint return yields better results for the couple, this financial privacy may be breached during the preparation of the return, which may be undesirable for one or both spouses.

Accordingly, there is a need and desire to determine whether a married couple should file its tax return jointly or separately in a manner that preserves both spouse's financial privacy.

BRIEF DESCRIPTION OF THE FIGURES

FIGS. 4 and 5 illustrate an example user interface that may be provided to the taxpayer during the process illustrated in FIG. 3.

FIGS. 6-8 illustrate example communications that may be transmitted and or received in accordance with an embodiment of the present disclosure.

DETAILED DESCRIPTION OF SEVERAL EMBODIMENTS

Embodiments described herein may be used to allow married couples to prepare separate individual tax returns while also being able to evaluate the merits of filing a joint electronic return in a manner that does not breach each spouse's financial privacy.

In one or more embodiments, a taxpayer may identify his/her spouse during the preparation of the taxpayer's individual tax return. The tax preparation service may send a communication to the spouse with a link to initiate the separate preparation of his/her own individual tax return. In one or more embodiments, the link will have a digital software token embedded within it for security purposes. In addition, the spouse may be notified that it is participating in a process attempting to maximize the tax filing outcome for the couple (e.g., maximize refund, minimize taxes owed, etc.). Upon completion of the individual returns, a joint return may be automatically prepared by the service provider. The service provider compares the result of the joint return against the net results of the individual returns. If the service provider determines that the joint return provides better results for both spouses, each spouse is provided with the joint return for their approval. If, on the other hand, the service provided determines that the individual returns provide better results, each spouse separately receives its own individual return. In accordance with the disclosed principles, because the service provider prepares the joint return based on the separate individual returns, the decision to choose the joint return may be made without each spouse having access to the other spouse's financial data.

Figure 1:
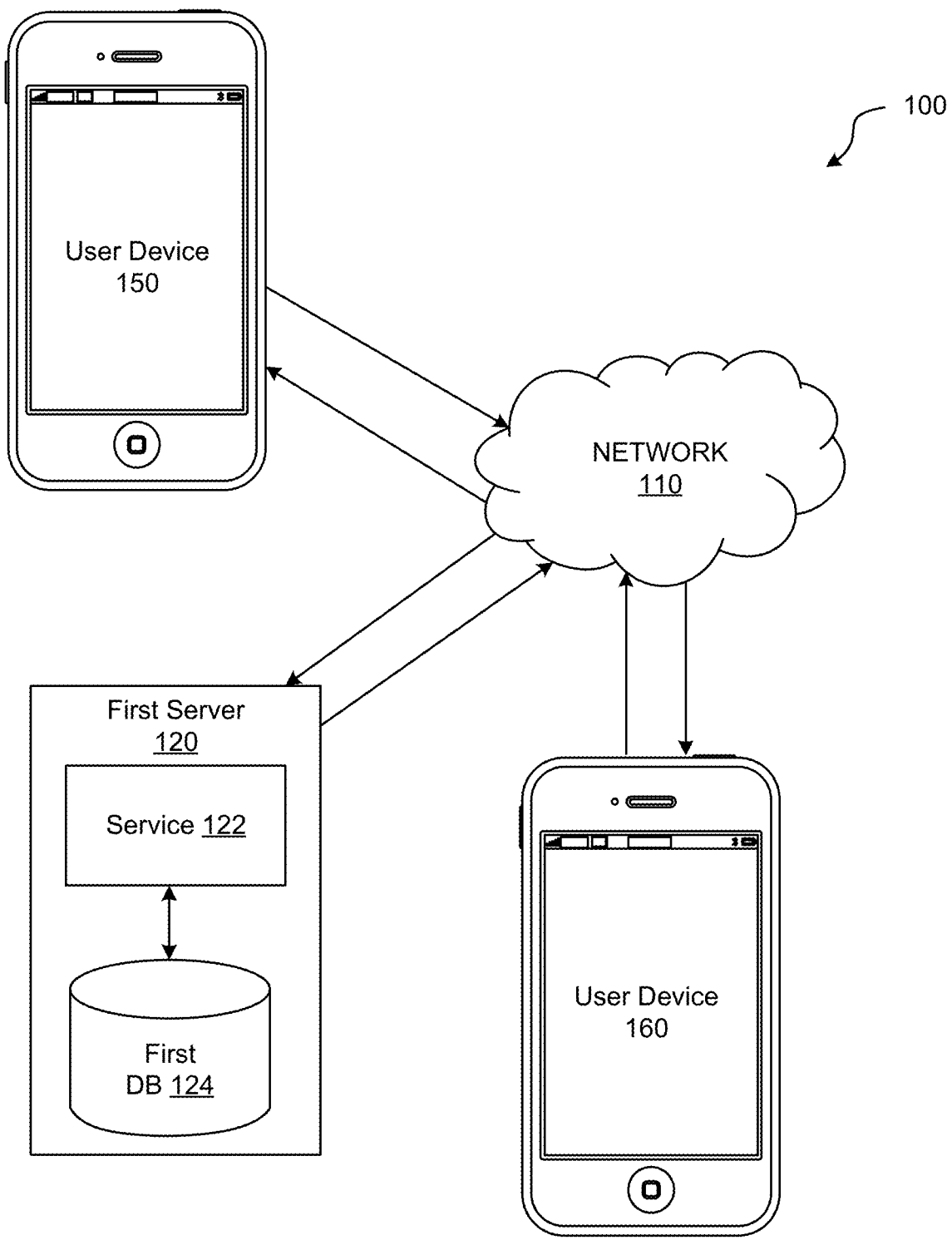
FIG. 1 shows an example of a system configured to implement a privacy preserving joint tax return process in accordance with an embodiment of the present disclosure.

FIG. 1 shows an example of a system 100 configured to implement a privacy preserving joint tax return process according to an embodiment of the present disclosure. System 100 may include a first server 120 and two or more user devices 150, 160. First server 120 and the user devices 150, 160 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

First server 120 may be configured to implement a first service 122, which in one embodiment may be used to facilitate the preparation of one or more electronic tax returns in accordance with the disclosed principles. In one or more embodiments, the first service 122 may input data from a database 124 and/or the user devices 150, 160 via network 110. Although not shown, the first service 122 may input data relevant for tax preparation from other services and or tax authority computing devices and or databases. First server 120 and first service 122 may execute the privacy preserving joint tax return process according to the disclosed principles using data stored in database 124 and or received from the user devices 150, 160. First service 122 may implement an information service, which may maintain data used throughout the process disclosed herein to provide individual and or joint electronic tax returns in a privacy preserving manner. The information service may be any network 110 accessible information service such as Turbo-Tax®, TurboTax® Live, and their respective variants, offered by Intuit® of Mountain View California.

User devices 150, 160 may be any device configured to present user interfaces and receive inputs thereto. For example, user devices 150, 160 may be a smartphone, personal computer, tablet, laptop computer, or other device.

First server 120, first database 124, and user devices 150, 160 are each depicted as single devices for ease of illustration, but those of ordinary skill in the art will appreciate that first server 120, first database 124, and or user devices 150, 160 may be embodied in different forms for different implementations. For example, first server 120 may include a plurality of servers or one or more databases serving as first database 124. In another example, more or less user devices 150, 160 may communicate with first server 120. A single user may have multiple user devices 150, 160 and/or there may be multiple users each having multiple user devices 150, 160.

Figure 2:
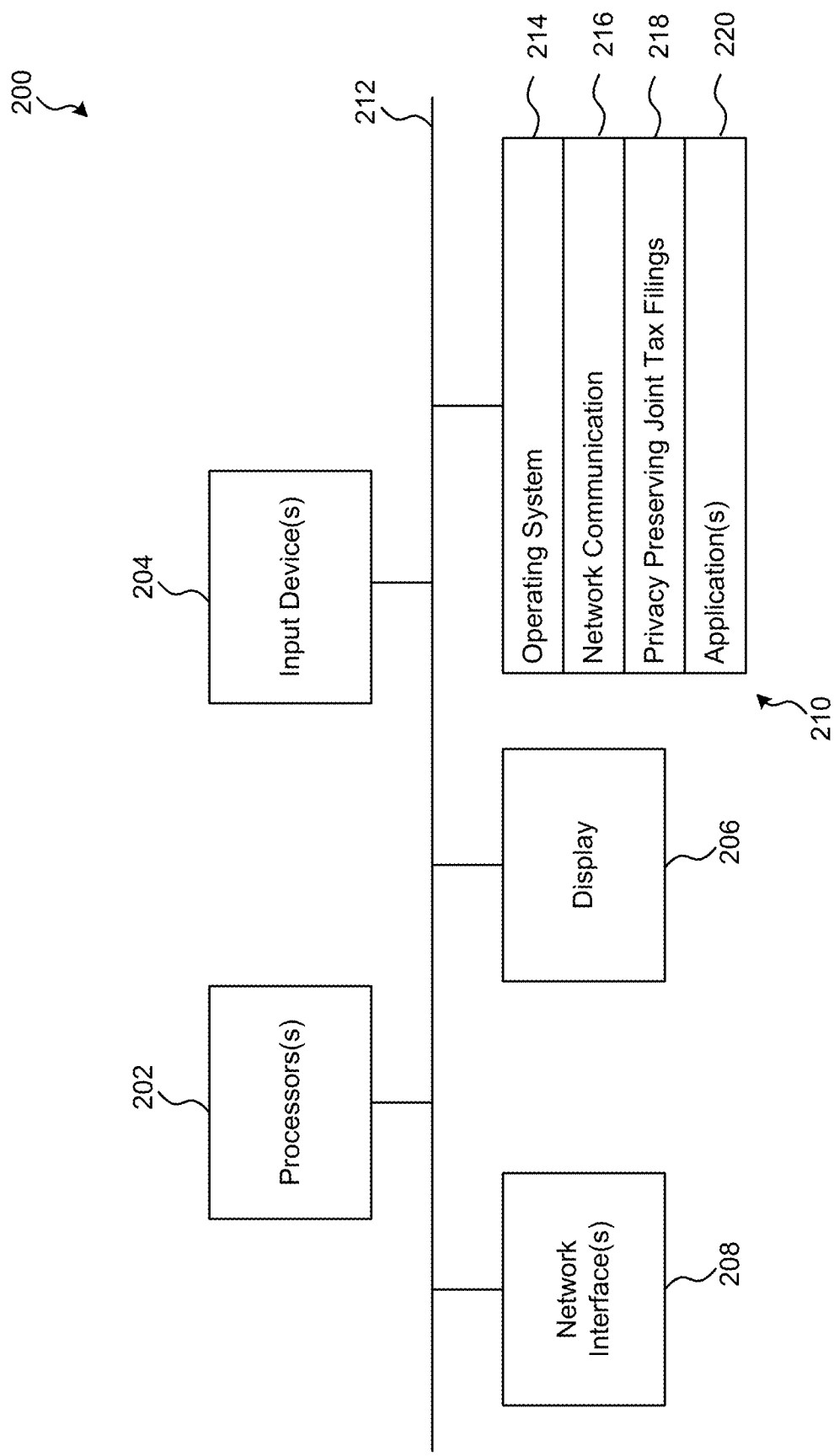
FIG. 2 shows a server device according to an embodiment of the present disclosure.

FIG. 2 is a block diagram of an example computing device 200 that may implement various features and processes as described herein. For example, computing device 200 may function as first server 120. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Privacy preserving joint filing instructions 218 may include instructions that implement the disclosed privacy preserving joint tax return processing described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
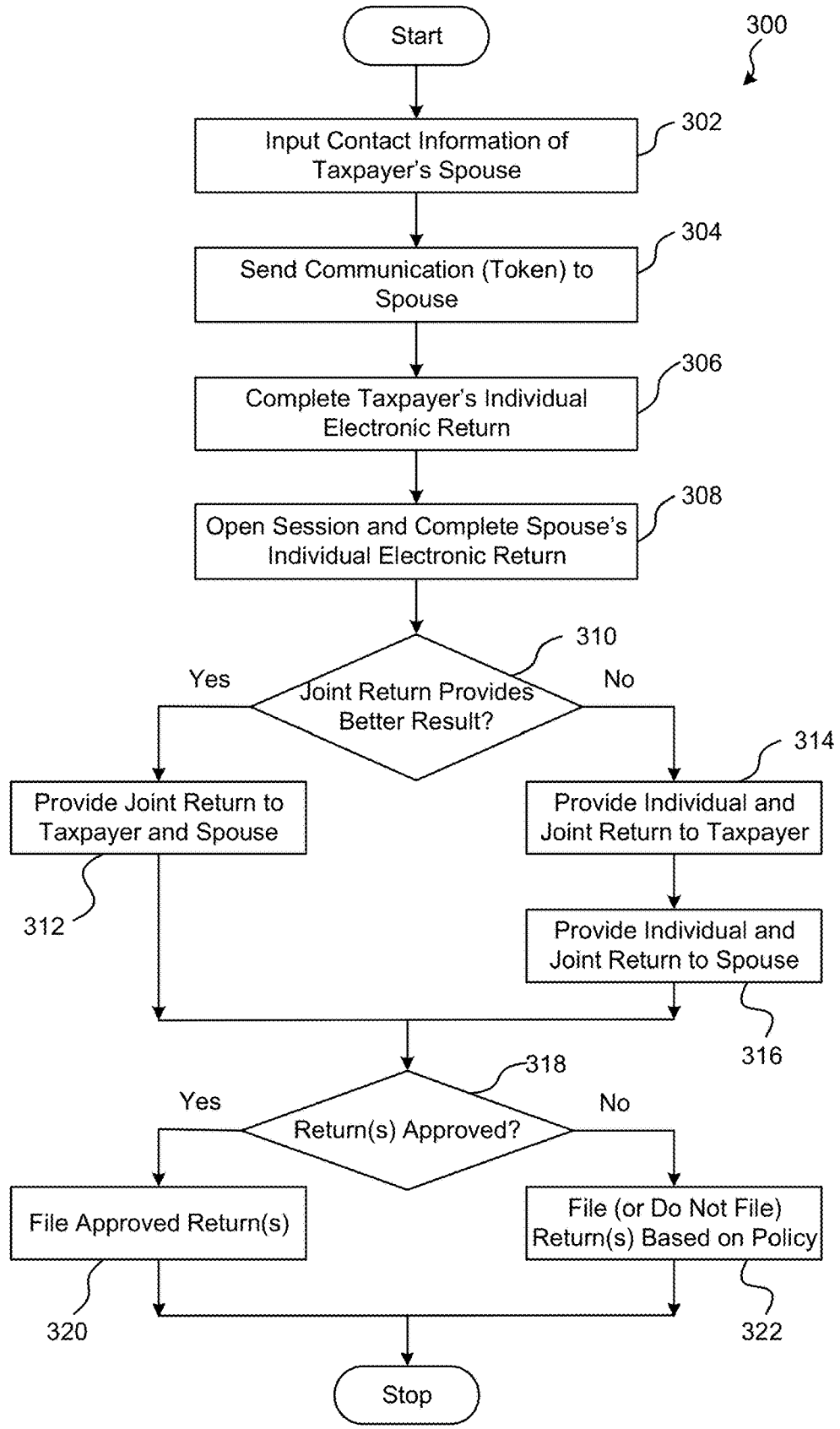
FIG. 3 an example privacy preserving joint tax return process according to an embodiment of the present disclosure.

FIG. 3 illustrates an example privacy preserving joint tax return process 300 according to an embodiment of the present disclosure. In one embodiment, system 100 may perform some or all of the processing illustrated in FIG. 3. For example, first service 122 (e.g., tax preparation service) on first server 120 (e.g., tax preparation computing device) may perform the steps of process 300 as discussed in detail below. Moreover, during the execution of the processes 300, first service 122 may input data from one or more databases including the first database 124 and or databases or memory on or connected to the user devices 150, 160.

In the illustrated embodiment, the process 300 may begin during the preparation of a taxpayer's individual electronic tax return. At some point during the individual electronic tax return preparation process, the taxpayer will be asked if he/she has a spouse and if the taxpayer wants the spouse to participate in the privacy preserving joint tax return process 300. If the taxpayer chooses to involve his/her spouse in the process 300, the taxpayer will be prompted to input contact information for his/her spouse. Accordingly, at step 302, the process 300 may input contact information for the taxpayer's spouse. In one embodiment, the contact information may include an email address so that the first service 122 may send the spouse an email inviting the spouse to participate in the process 300. In one or more embodiments, the contact information may include a mobile telephone number so that the first service 122 may send the spouse a text message inviting the spouse to participate in the process 300. It should be appreciated that if the taxpayer does not identify his/her spouse, the process 300 terminates.

At step 304, the process 300 may send the communication to the identified spouse. For example, if an email address was input at step 302, the first service 122 may send the spouse an email inviting the spouse to participate in the privacy preserving joint tax return process 300. Alternatively, if a mobile telephone number was input at step 302, the first service 122 may send the spouse a text message inviting the spouse to participate in the process 300. The communication may include a notice that the spouse is participating in the process to maximize the tax filing outcome for the couple (e.g., maximize refund, minimize taxes owed, etc.). In addition, the communication may include a link or other mechanism that the spouse may access to accept the invitation and or initiate the preparation of his/her individual tax return. It should be appreciated that if the spouse declines the invitation, the process 300 terminates.

In one or more embodiments, the process 300 may generate a digital token for the spouse's participation in the process 300 (e.g., a token associated with an individual electronic tax return preparation process for the spouse). As known in the art, a token may be a series of digits forming a unique security code for a process and or transaction. In one or more embodiments, to ensure the security of the process 300, the token may be embedded within the link transmitted to the spouse. As such, the process 300 generates a secured link for joining the process. In these embodiments, the spouse may only participate by selecting the link with the embedded token. Any other attempt to join the process 300 may be deemed an unauthorized access. If an unauthorized access is detected, the first service 122 will prevent the unauthorized participant from joining the process.

It should be appreciated that any secure process for generating the digital token, embedding it within the link, and determining whether that secured link has been used by the spouse may be used. For example, in one or more embodiments, the well-known RSA cryptosystem may be used at step 304 to ensure the security of the link. In one or more embodiments, once an authorized attempt to join the process 300 has been made (e.g., the spouse clicks on the secured link), a confirmation email may be sent to the taxpayer indicating that the spouse has accepted the invite.

At step 306, the taxpayer may complete his/her individual return. In one or more embodiments, the taxpayer may be notified that he/she will receive a communication (e.g., email, text message) once their spouse finished its individual return. The communication may notify the taxpayer that the email may contain his/her individual electronic return and or a joint electronic return with a recommendation as to which return(s) should be filed to maximize the tax filing outcome for the couple.

At step 308, the taxpayer spouse's may initiate his/her individual tax return preparation session by accessing the secured link provided in the communication he/she received (at step 304). In one or more embodiments, the process 300 may ensure that the token generated at step 304 was part of the selected link as a security measure. If it is determined that the secured link (i.e., the link with the embedded token) was not used, the first service 122 may prevent the unauthorized participant from joining the process 300. In one or more embodiments, once the spouse completes the individual return, he/she may be notified that he/she will receive a communication (e.g., email, text message) once the taxpayer (i.e., his/her spouse) finished its individual return. The communication may notify the spouse that the email may contain his/her individual electronic tax return and or a joint electronic tax return with a recommendation as to which return(s) should be filed to maximize the tax filing outcome for the couple. It should be appreciated that while steps 306 and 308 are illustrated as being sequentially performed, the steps may be performed in parallel. Moreover, it should be appreciated that the spouse may complete step 308 before the taxpayer completes step 306 without altering the disclosed principles.

At step 310, the process 300 may determine whether filing the joint electronic tax return provides a better tax result for the couple than filing separate individual electronic tax returns. For example, the process 300 may determine that the joint electronic tax return provides the couple with a larger tax refund than the net refund provided by the two individual electronic tax returns. Similarly, the process 300 may determine that the joint electronic tax return provides the couple with a smaller tax deficiency payment than the net tax deficiency provided by the two individual electronic tax returns. Since the process 300 makes this determination, neither spouse is involved in the decision and at this point, meaning that neither spouse has seen the other spouse's financial information used for the individual and joint electronic tax returns. As such, both spouse's privacy has been preserved—something that is not achievable by existing tax preparation systems/services.

If it is determined that filing the joint electronic tax return provides a better tax result for the couple than filing separate individual electronic tax returns (i.e., a Yes at step 310), the process 300 continues at step 312 where it provides both spouses with a copy of the joint electronic tax return. In one or more embodiments, the joint electronic tax return may be emailed or sent by another method (e.g., text message) to both spouses. In one or more embodiments, the joint electronic tax return may be emailed or sent by another method (e.g., text message) to both spouses simultaneously as part of the same communication so that the spouses are aware that each spouse has received the same joint electronic tax return. In one or more embodiments, the communication providing the joint electronic tax return to the couple requests that each spouse approve the return (e.g., by electronically signing the return and or e-filing authorization form 8879, selecting a link within the communication, etc.).

If it is determined that filing the joint electronic tax return does not provide a better tax result for the couple than filing separate individual electronic tax returns (i.e., a No at step 310), the process 300 continues at step 314 where it provides the taxpayer a copy of his/her individual tax return. In one or more embodiments, the process 300 may also provide the taxpayer with the prepared joint electronic tax return. In one or more embodiments, the taxpayer is informed that filing the individual electronic tax return is recommended and that filing the joint electronic tax return is not recommended. In one or more embodiments, the returns may be emailed or sent by another method (e.g., text message) to the taxpayer. In one or more embodiments, the communication providing the individual and or joint electronic tax returns to the taxpayer requests that that the taxpayer approve the individual return (e.g., by electronically signing the return and or e-filing authorization form 8879, selecting a link within the communication, etc.). In one or more embodiments, the taxpayer may be provided the option with approving the joint return instead of the individual return.

At step 316, the process 300 provides the taxpayer's spouse with a copy of his/her individual electronic tax return. In one or more embodiments, the process 300 may also provide the spouse with the prepared joint electronic tax return. In one or more embodiments, the spouse is informed that filing the individual return is recommended and that filing the joint return is not recommended. In one or more embodiments, the returns may be emailed or sent by another method (e.g., text message) to the spouse. In one or more embodiments, the communication providing the individual and or joint electronic tax returns to the spouse requests that that the spouse approve the individual return (e.g., by electronically signing the return and or e-filing authorization form 8879, selecting a link within the communication, etc.). In one or more embodiments, the spouse may be provided the option with approving the joint electronic tax return instead of the individual return.

At step 318, the process 300 determines if both spouses have approved and or authorized the filing of the recommended electronic tax return(s). That is, the process 300 determines if the recommended joint electronic tax return (step 312) was approved and or authorized by both spouses or if the recommended individual electronic tax returns (step 314, 316) were respectively approved and or authorized by each spouse. If it is determined that both spouses have approved and or authorized the filing of the recommended return(s) (i.e., a Yes at step 318), the process 300 continues at step 320 where the recommended return(s) is/are electronically filed with the appropriate tax authority. The determination may be based on a communication from both spouses authorizing the recommended return(s). For instance, the communication providing the recommended electronic tax return(s) to the spouses may include one or more link(s) the each spouses to authorize filing of the recommended return(s). The detection that the selection of the link(s) has occurred, may be the indication that both spouses have approved and or authorized the electronic filing of the recommended electronic tax return(s).

If it is determined at step 318 that both spouses have not approved and or authorized the electronic filing of the recommended electronic tax return(s) (i.e., a No at step 318), the process 300 continues at step 322 where one or more of the prepared electronic tax returns may be filed with the appropriate tax authority based on a predetermined filing policy. The determination may be based on a communication from one or more of the spouses specifically rejecting the recommended return(s). For instance, the communication providing the recommended return(s) to the spouses may include a link to reject the recommended return(s). The detection of the selection of the link by either or both spouses may be the indication that both spouses have not approved and or authorized the electronic filing of the recommended electronic tax return(s). In one or more embodiments, the passage of a predetermined period of time without receiving both spouses' authorization may be the indication that both spouses have not approved and or authorized the filing of the recommended return(s).

The electronic tax return or returns filed in this instance are deemed the "default return(s)." For example, the tax preparation service may have communicated to both spouses during one of the communications discussed above, that the electronic tax return or returns providing the couple with the better tax result (i.e., the recommended return(s)) will be electronically filed by default. In one or more embodiments, the predetermined policy may be to file the joint electronic tax return by default, whether it is recommended or not. In one or more embodiments, the predetermined policy may be to file the individual electronic tax returns by default, whether they are recommended or not. In these embodiments, as part of the policy, the process 300 may have requested and received pre-authorization to electronically file the default electronic tax return(s) (e.g., at steps 304, 306, and or 308) to address the scenario in which one or more of the spouses did not authorize the recommended return.

In one or more embodiments, no returns may be filed by the first service 122 until proper authorizations for a joint electronic tax return or both individual electronic tax returns are received. In any event, the spouses are not presented with the financial input of the other spouse, unless the other spouse approves.

Figure 4:
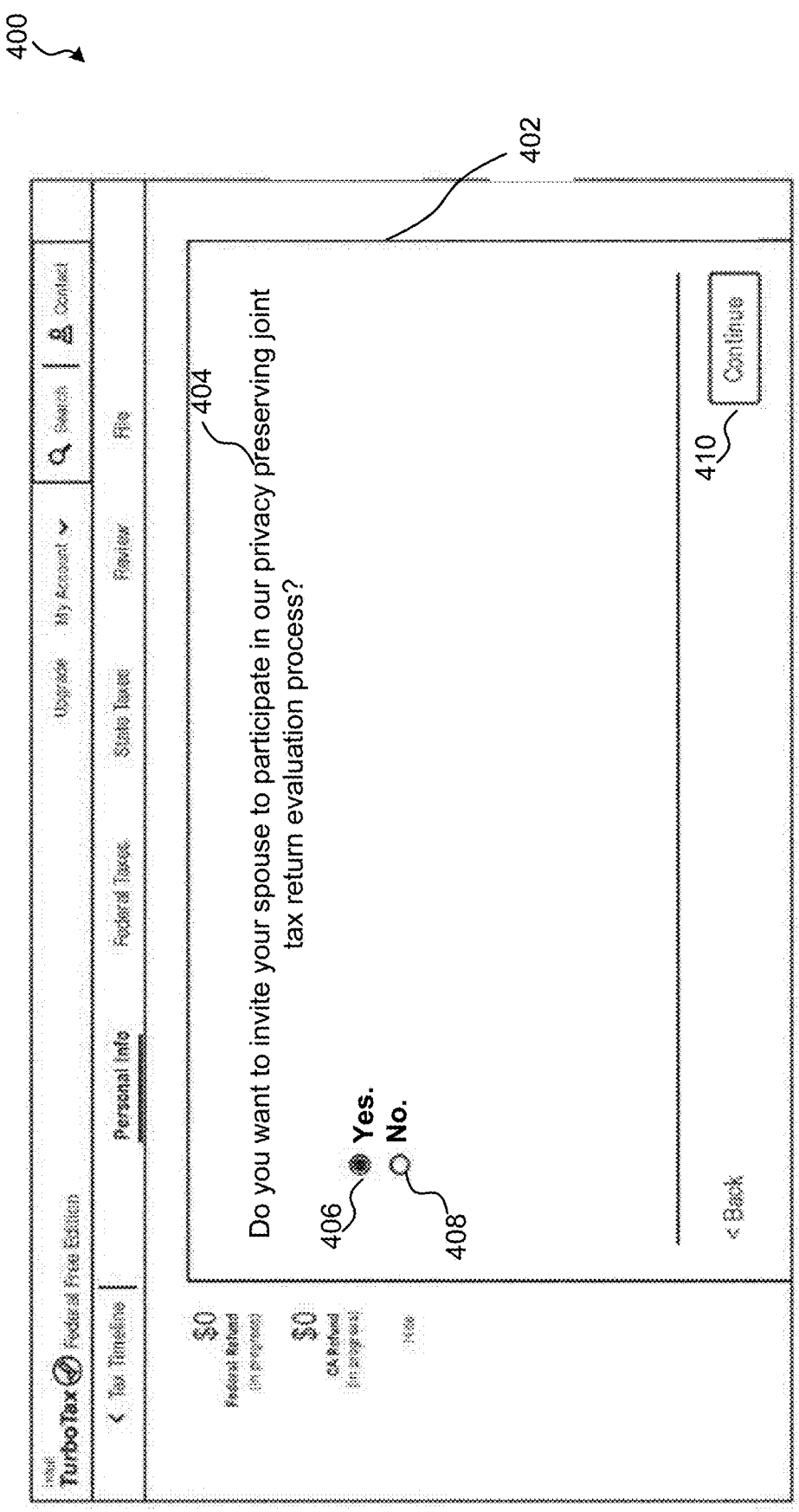
Figure 5:
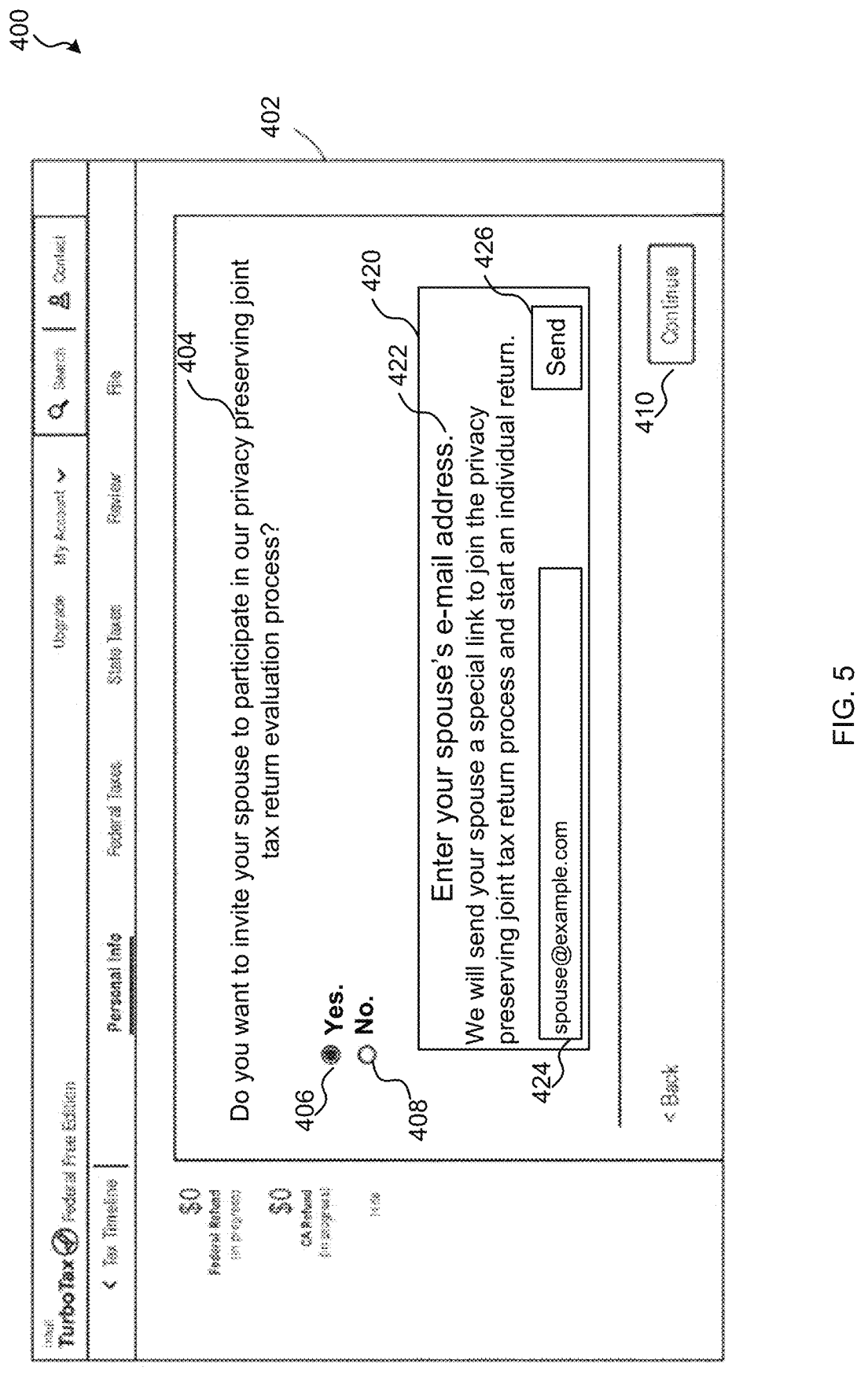
Figure 7:
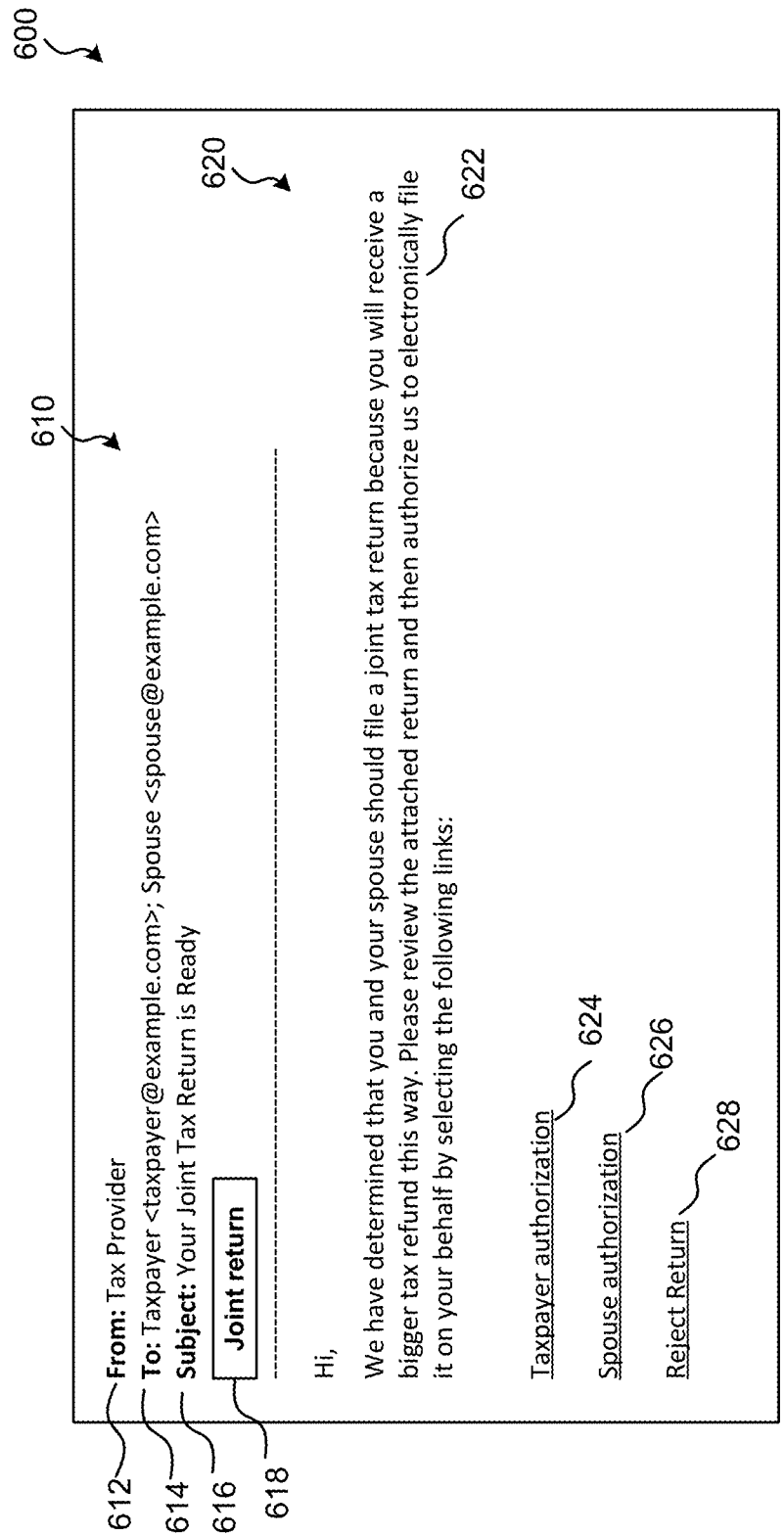
Figure 8:
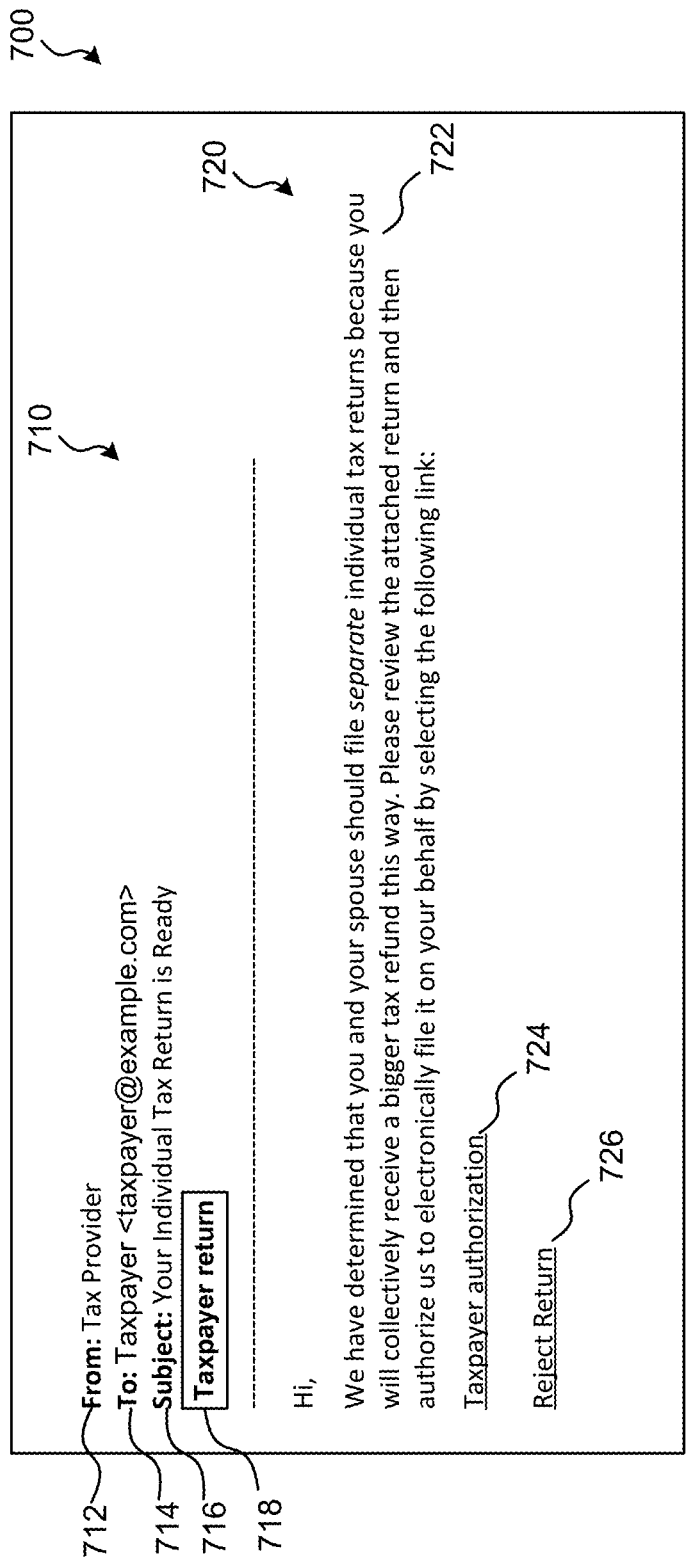

In one or more embodiments, the process 300 may benefit from user interfaces providing instructions to the couple and or communications coordinate the participation of the spouses. FIGS. 4 and 5 illustrate an example user interface 400 that may be provided to the taxpayer during the process 300 and FIGS. 6-8 illustrate example communications 500, 600, 700 that may be transmitted and or received in accordance with one or more embodiments of the present disclosure.

FIG. 4 illustrates an example user interface 400 that may be used by the taxpayer to invite his/her spouse to the privacy preserving joint tax return process (e.g., process 300) disclosed herein. In the illustrated example, the user interface 400 includes a first portion 402 comprising a message 404 for the taxpayer. In the illustrated example, the message 404 asking whether the taxpayer wants to invite his/her spouse to the privacy preserving joint tax return process (e.g., "Do you want to invite your spouse to participate in our privacy preserving joint tax return evaluation process?").

The first portion 402 may also comprise a first selector 406 allowing the taxpayer to say "yes" and invite the spouse to the process and a second selector 408 allowing to taxpayer to say "no" and not allow the spouse to participate in the process. In the illustrated example, the taxpayer has selected first selector 406 providing it with a different appearance than the second selector 408 (e.g., the first selector 406 may appear darker or filled in while the second selector 408 may appear lighter or not filled in). Once the taxpayer has made its selection, the taxpayer may select a third selector 410 identified as a "continue" button. The selection of the third selector 410 is an indication to the process 300 that the taxpayer has made decision as to whether to invite the spouse to the process or not.

FIG. 5 illustrates the example user interface 400 that has been updated to include a second portion 420 instructing the taxpayer for his/her spouse's email address. In one embodiment, the second portion 420 is only displayed after the taxpayer selected the first selector 406. In the illustrated example, the second portion 420 comprises a message 422 instructing the taxpayer to enter his/her spouse's email address (e.g., "Enter your spouse's e-mail address."). In the illustrated example, the message 422 also includes a description of what will happen next (e.g., "We will send your spouse a special link to join the privacy preserving joint tax return process and start an individual return.").

In the illustrated example, second portion 420 includes a fillable field 424 allowing the taxpayer to enter the spouse's email address. In the illustrated example, the taxpayer has entered "spouse@example.com" into the field 424. The second portion 420 also includes a selector 426 identified as a "send" button. The selection of the selector 426 will cause the first service 122 to send the email with the secured link to the spouse at the entered email address.

In one or more embodiments, the email to the spouse may resemble the example communication 500 illustrated in FIG. 6. In the illustrated example, the communication 500 includes a header portion 510 and a body portion 520. The header portion 510 includes an identification 512 of the sender of the email (e.g., the tax service provider or first service 122). The header portion 510 also includes an identification 514 of the recipient of the email (e.g., the spouse at "spouse@example.com"). The header portion 510 also includes an identification 516 of the subject of the email (e.g., "Invitation to join your spouse in a privacy preserving tax return process"). Thus, the header portion 510 may provide the context of the email and who it was sent by. The spouse may use this information to confirm receipt of the communication 500 and or communicate with the taxpayer if desired (e.g., to obtain verification that the taxpayer initiated the process, to obtain further explanation of the process, etc.).

In the illustrated example, the body portion 520 includes a message 522 explaining why the email was sent ("Your spouse (taxpayer@example.com) has invited you to participate in a process to evaluate whether the two of you should file a joint tax return or whether you each should file an individual return."). In addition, the message 522 explains how the spouse may join the privacy preserving join tax return process and why it may be beneficial to do so (e.g. "Right now, your spouse is preparing an individual return. If you click on the link below, you will be able to prepare your individual return without your spouse having access to the information used to fill out the return. This means, that your financial information and privacy is preserved until you want to share it with your spouse!").

In the illustrated example, the message 522 also explains the process and what the spouse should expect from it (e.g., "Once you and your spouse complete your individual returns, we will prepare a joint return and evaluate whether the joint return is more beneficial to you and your spouse. If so, we will send both of you the joint return with a recommendation for filing it. If not, we will send each of you a separate email with a recommendation to file your respective individual return.").

In the illustrated example, the message 522 includes the secured link 524 prepared by the process, allowing the spouse to accept the taxpayer's invitation and initiate an individual return (e.g., "If you wish to participate, please click on this link to get started."). As discussed above, the secured link includes the digital token prepared when it was determined that the taxpayer requested inviting his/her spouse to the process. Although not shown, the body portion 520 could also include a link to reject the invitation.

FIG. 7 illustrates an example communication 600 that may be sent to both spouses when it is determined that filing of the join tax return is recommended. In the illustrated example, the communication 600 includes a header portion 610 and a body portion 620. The header portion 610 includes an identification 612 of the sender of the email (e.g., the tax service provider or first service 122). The header portion 610 also includes an identification 614 of the recipients of the email (e.g., the taxpayer at "taxpayer@example.com" and the spouse at "spouse@example.com"). The header portion 610 also includes an identification 616 of the subject of the email (e.g., "Your Joint Tax Return is Ready"). Thus, the header portion 610 may provide the context of the email and who it was sent by.

In the illustrated example, the header portion 610 also includes a graphical icon 618 or other selectable item for opening up the joint electronic tax return. The spouses may use this icon 618 to download and review the joint electronic tax return prepared by the service provider based on the individual electronic tax returns.

In the illustrated example, the body portion 620 includes a message 622 informing the married couple that the process has determined that filing a joint electronic tax return is recommended and why (e.g., "We have determined that you and your spouse should file a joint tax return because you will receive a bigger tax refund this way."). The illustrated message 622 also has instructions for the spouses to complete and authorize the filing of the joint electronic tax return (e.g., "Please review the attached return and then authorize us to electronically file it on your behalf by selecting the following links:"). In the illustrated example, each spouse is provided with its own link 624 ("Taxpayer authorization"), 626 ("Spouse authorization") that when selected allows the spouses to authorize the electronic filing of the recommended joint electronic tax return. In the illustrated embodiment, the body portion 620 includes a link 728 ("Reject Return") to reject the electronic filing of the joint return. That link 728 may be selected by either or both spouses.

FIG. 8 illustrates an example communication 700 that may be sent to each, individually, when it is determined that filing of separate individual electronic tax returns is recommended. In the illustrated example, the communication 700 includes a header portion 710 and a body portion 720. The header portion 710 includes an identification 712 of the sender of the email (e.g., the tax service provider or first service 122). The header portion 710 also includes an identification 714 of the recipient of the email (e.g., the taxpayer at "taxpayer@example.com"). The header portion 710 also includes an identification 716 of the subject of the email (e.g., "Your Individual Tax Return is Ready"). Thus, the header portion 710 may provide the context of the email and who it was sent by.

In the illustrated example, the header portion 710 also includes a graphical icon 718 or other selectable item for opening up the individual electronic tax return. The taxpayer may use this icon 718 to download and review the individual electronic tax return prepared by the service provider. The illustrated example is shown as a communication 700 to the taxpayer, but it should be appreciated that a similar communication may be provided to the spouse. As can be appreciated, in that communication, the spouse is provided with a link to his/her individual electronic tax return.

In the illustrated example, the body portion 720 includes a message 722 informing the taxpayer (or spouse) couple that the process has determined that filing individual electronic tax returns are recommended and why (e.g., "We have determined that you and your spouse should file separate individual tax returns because you will collectively receive a bigger tax refund this way."). The illustrated message 722 also has instructions for the spouse to complete and authorize the filing of the individual electronic tax return (e.g., "Please review the attached return and then authorize us to electronically file it on your behalf by selecting the following link:"). In the illustrated example, the spouse is provided with a link 724 ("Taxpayer authorization") that when selected allows the taxpayer (or spouse) to authorize the electronic filing of the recommended individual electronic tax return. In the illustrated embodiment, the body portion 720 includes a link 726 ("Reject Return") to reject the filing of the individual electronic tax return.

As can be appreciated, the disclosed systems and processes provide several advantages over conventional tax preparation services, particularly in the preparation and evaluation of a married couple's tax liability. For example, currently, there is not one service in the market that offers privacy preserving joint tax return preparation and evaluation. The disclosed systems and processes may do so by splitting the couple's tax return process into steps separately performed by each spouse and then using separately prepared individual returns to automatically prepare and evaluate a joint return for the couple. Thus, the financial privacy of each spouse is preserved until it is recommended that the couple file a joint return. Accordingly, the disclosed principles balance the need to jointly submit details for providing and evaluating a joint tax return while preserving each spouse's privacy.

Moreover, the disclosed systems and processes provide a secure method of initiating an individual tax return session for the spouse of a taxpayer. For example, a security token may be generated during the taxpayer's session and embedded into a link that provides access to the taxpayer's spouse to a private tax preparation session/process that may be associated with the taxpayer's session/process. Any attempt to initiate a tax preparation session and associate it with the taxpayer's tax preparation session/process will be rejected unless it is initiated from the secured link. Thus, a simple, yet effective security process may be used to prevent access to the taxpayer's or the couple's financial information.

In addition, should either spouse reject filing the tax return(s) recommended by the disclosed system and processes, a predetermined and preauthorized policy may be used to ensure that one or more tax returns are filed by the married couple by default. This would prevent the couple from missing its tax filing and potential penalties.

In addition, the disclosed user interfaces and electronic communications guide the spouses through the privacy preserving joint tax return process. For example, one or more user interfaces and or graphical components may be used to input relevant communication information about the taxpayer's spouse and initiate the privacy preserving joint tax return process. Moreover, one or more electronic communications disclosed herein may be used to communicate a secured link (e.g., link having an embedded token therein) for the spouse's secured and private tax session, and to review, accept and or reject the system recommended return (s). As such, the disclosed systems and processes are an advancement in the electronic tax preparation field.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method performed by a tax preparation computing device, said method comprising:
   inputting, during a first individual electronic tax return preparation process for a first taxpayer, contact information for a second taxpayer;
   sending a communication to the second taxpayer using the input contact information, the communication comprising a secured link for initiating a second individual electronic tax return preparation process for the second taxpayer, wherein sending the communication comprises:
   generating a digital token;

embedding the token within the secured link for initiating the second individual electronic tax return preparation process; and sending the secured link with the embedded token in the communication to the second taxpayer;

determining that a first individual electronic tax return has been completed for the first taxpayer and that a second individual electronic tax return has been completed for the second taxpayer by accessing the secured link with the embedded token;

automatically generating a joint electronic tax return for the first and second taxpayers based on the completed first and second individual electronic tax returns; and comparing, without a user input, a tax result of the joint electronic tax return with a net tax result of the first and second individual electronic tax returns, wherein the first taxpayer is not privy to the second individual electronic tax return and the second taxpayer is not privy to the first individual electronic tax return after the first and second individual electronic tax returns have been completed.

2. The method of claim 1, further comprising:
based on the comparing, determining that the joint electronic tax return provides a greater tax refund than a net tax refund of the first and second individual electronic tax returns or that the joint electronic tax return provides a lesser tax shortage than a net tax shortage of the first and second individual electronic tax returns; and
sending the joint electronic tax return in an electronic communication to the first and second taxpayers.

3. The method of claim 2, further comprising:
determining that the first and second taxpayers have each authorized filing of the joint electronic tax return; and
electronically filing the joint electronic tax return.

4. The method of claim 2, further comprising:
determining that at least one of the first and second taxpayers have not authorized filing of the joint electronic tax return; and
electronically filing the first and second individual electronic tax returns.

5. The method of claim 2, further comprising:
determining that at least one of the first and second taxpayers have not authorized filing of the joint electronic tax return; and
prohibiting electronic filing the joint electronic tax return and the first and second individual electronic tax returns.

6. The method of claim 1, further comprising:
based on the comparing, determining that the first and second individual electronic tax returns provide a greater net tax refund than a tax refund of the joint electronic tax return or that that the first and second individual electronic tax returns provide a greater net tax shortage than a tax shortage of the joint electronic tax return;
sending the first individual electronic tax return in a first electronic communication to the first taxpayer; and
sending the second individual electronic tax return in a second electronic communication to the second taxpayer.

7. The method of claim 6, further comprising:
determining that the first taxpayer has authorized filing of the first individual electronic tax return;
determining that the second taxpayer has authorized filing of the second individual electronic tax return; and
electronically filing the first and second individual electronic tax returns.

8. The method of claim 2, further comprising:
determining that the first taxpayer has not authorized filing of the first individual electronic tax return or that the second taxpayer has authorized filing of the second individual electronic tax return; and
electronically filing the joint electronic tax return.

9. The method of claim 2, further comprising:
determining that the first taxpayer has not authorized filing of the first individual electronic tax return or that the second taxpayer has authorized filing of the second individual electronic tax return; and
prohibiting electronic filing the joint electronic tax return and the first and second individual electronic tax returns.

10. A system comprising:
a tax preparation computing device configured to:
input, during a first individual electronic tax return preparation process for a first taxpayer, contact information for a second taxpayer;
send a communication to the second taxpayer using the input contact information, the communication comprising a secured link for initiating a second individual electronic tax return preparation process for the second taxpayer, wherein sending the communication comprises:
generating a digital token;
embedding the token within the secured link for initiating the second individual electronic tax return preparation process; and
sending the secured link with the embedded token in the communication to the second taxpayer;
determine that a first individual electronic tax return has been completed for the first taxpayer and that a second individual electronic tax return has been completed for the second taxpayer, by accessing the secured link with the embedded token; and
automatically generate a joint electronic tax return for the first and second taxpayers based on the completed first and second individual electronic tax returns; and
compare, without a user input, a tax result of the joint electronic tax return with a net tax result of the first and second individual electronic tax returns, wherein the first taxpayer is not privy to the second individual electronic tax return and the second taxpayer is not privy to the first individual electronic tax return after the first and second individual electronic tax returns have been completed.

11. The system of claim 10, wherein the tax preparation computing device is further configured to:
based on the comparison, determine that the joint electronic tax return provides a greater tax refund than a net tax refund of the first and second individual electronic tax returns or that the joint electronic tax return provides a lesser tax shortage than a net tax shortage of the first and second individual electronic tax returns; and
send the joint electronic tax return in an electronic communication to the first and second taxpayers.

12. The system of claim 11, wherein the tax preparation computing device is further configured to:
determine that the first and second taxpayers have each authorized filing of the joint electronic tax return; and
electronically file the joint electronic tax return.

13. The system of claim 11, wherein the tax preparation computing device is further configured to:

determine that at least one of the first and second taxpayers have not authorized filing of the joint electronic tax return; and electronically file the first and second individual electronic tax returns.

14. The system of claim 10, wherein the tax preparation computing device is further configured to:

based on the comparison, determine that the first and second individual electronic tax returns provide a greater net tax refund than a tax refund of the joint electronic tax return or that that the first and second individual electronic tax returns provide a greater net tax shortage than a tax shortage of the joint electronic tax return;

send the first individual electronic tax return in a first electronic communication to the first taxpayer; and send the second individual electronic tax return in a second electronic communication to the second taxpayer.

15. The system of claim 14, wherein the tax preparation computing device is further configured to:

determine that the first taxpayer has authorized filing of the first individual electronic tax return;

determine that the second taxpayer has authorized filing of the second individual electronic tax return;

electronically file the first and second individual electronic tax returns.

16. The system of claim 10, wherein the tax preparation computing device is further configured to determine that the first taxpayer has not authorized filing of the first individual electronic tax return or that the second taxpayer has authorized filing of the second individual electronic tax return; and electronically file the joint electronic tax return.

* * * * *